US006604831B1

(12) United States Patent
Prestigomo et al.

(10) Patent No.: US 6,604,831 B1
(45) Date of Patent: Aug. 12, 2003

(54) ELEVATABLE DISPLAY APPARATUS

(75) Inventors: Phillip D. Prestigomo, Woodlands, TX (US); Chadwick F. Smith, Jr., Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/465,721

(22) Filed: Dec. 17, 1999

(51) Int. Cl.[7] .................. G03B 21/22; G03B 21/10; G03B 17/02; G03B 17/00; F16M 11/24
(52) U.S. Cl. .................. 353/119; 352/104; 352/242; 352/243; 248/188.2; 248/188.7
(58) Field of Search ................ 353/30, 31, 79, 353/80, 119, 122; 352/104, 242, 243, 244; 248/188.2, 188.7, 655, 665

(56) References Cited

U.S. PATENT DOCUMENTS

| | | | | |
|---|---|---|---|---|
| 2,431,669 A | * | 11/1947 | Nemeth | 248/413 |
| 2,696,961 A | * | 12/1954 | Fox | 248/650 |
| 2,745,313 A | * | 5/1956 | Taylor | 353/122 |
| 2,793,563 A | * | 5/1957 | Koskela | 353/119 |
| 2,809,553 A | * | 10/1957 | Van Den Broek | 353/119 |
| 3,002,426 A | * | 10/1961 | McCabe | 353/57 |
| 3,049,971 A | * | 8/1962 | Pester | 353/119 |
| 3,148,583 A | * | 9/1964 | Maiershofer | 353/119 |
| 3,251,568 A | * | 5/1966 | Moe et al. | 248/649 |
| 3,448,950 A | * | 6/1969 | Kluge | 248/649 |
| 3,733,118 A | * | 5/1973 | Gundlach | 352/97 |
| 5,388,792 A | | 2/1995 | Hastings et al. | 248/188.1 |
| 5,639,152 A | * | 6/1997 | Nelson | 353/119 |
| 5,806,950 A | * | 9/1998 | Gale et al. | 353/78 |

* cited by examiner

Primary Examiner—Rodney Fuller

(57) ABSTRACT

A portable image projector is provided with a vertically elongated tower configuration to substantially reduce its vertical footprint when it is placed on a horizontal support surface for use. A stabilizing foot is positioned below the housing portion of the projector and is horizontally pivotable between a retracted orientation in which the foot is disposed within the vertical footprint of the projector housing, and an extended orientation in which the foot projects outwardly beyond opposite sides of the projector housing. The stabilizing foot is pivotally secured to the bottom ends of a spaced pair of arcuate elevating leg members that extend upwardly through openings in the bottom side of the housing. The leg members are vertically movable through the housing openings between retracted and extended positions and are resiliently biased in a downward direction relative to the housing. A latch mechanism releasably locks the legs in a selected vertical orientation and may be operated to selectively permit retraction or extension of the legs in a manner controllably adjusting the pivotal elevation of the lens portion of the projector.

43 Claims, 6 Drawing Sheets

ELEVATABLE DISPLAY APPARATUS

BACKGROUND OF THE INVENTION

1. Field of the Invention

The present invention generally relates to image display apparatus and, in a preferred embodiment thereof, more particularly relates to a projector having a space-saving tower orientation, a horizontally pivotable stabilizing support foot, and spring-loaded support leg members selectively operable to pivotally adjust the elevation of a lens-supporting portion of the projector housing.

2. Description of Related Art

A variety of electrically powered image display devices are known and include, for example, computer monitors, television sets and portable projectors for creating images on surfaces remote from the display device. Because of the typical exterior configuration of a conventional portable projector, the way in which it is typically used, and the distance of the displayed image from the projector, a variety of problems, limitations and disadvantages are commonly associated with conventionally constructed portable projectors.

For example, a conventional projector is typically of a rectangular configuration in which its vertical dimension is considerably less than its horizontal width or depth. While this is a well-known, stable configuration, it causes the projector to occupy a considerable area of the horizontal support surface (often the top of a small table) upon which it is placed for use. This vertically compact configuration places the projector's lens at a relatively low level on the table, thereby often requiring that the projector lens be elevated (by upwardly and rearwardly pivoting the projector housing) a substantial amount to cause the projected image to be properly received on the typically elevated display screen remote from the projector. Due to this need to upwardly pivot the lens to a substantial degree the lens axis is correspondingly offset a considerable degree from being perpendicular to the screen. This, in turn, often causes an undesirable "keystoning" angular distortion of the projected image on the remote display screen.

Moreover, because of the low vertical profile of the conventionally configured projector, and the resulting low placement of its lens relative to the horizonal projector—supporting surface, it is difficult for the projector to "shoot over" obstacles disposed on the support surface—such as glasses, plants, etc. These items must typically be removed from the front portion of the support surface, to one side of the projector, or removed from the support surface altogether.

Additionally, the necessary pivotal elevation adjustment of the projector can be a somewhat cumbersome, awkward task. Conventionally, a front underside portion of the projector housing is provided with screw-in elevating legs. To pivotally elevate or lower the projector relative to its supporting surface, and correspondingly adjust the image location on the screen, it is typically necessary to lift a front portion of the projector while laboriously screwing its elevating legs in or out as the case may be.

As can readily be seen from the foregoing, a need exists for an improved portable projector that eliminates or at least substantially reduces the above-mentioned problems, limitations and disadvantages of conventionally constructed projectors of the type generally described above. It is to this need that the present invention is directed.

SUMMARY OF THE INVENTION

In carrying out principles of the present invention, in accordance with a preferred embodiment thereof, a specially designed image display device is provided. Representatively, the display device is a portable projector operatively connectable to a VGA port of a computer, but could alternatively be a display device of a variety of other types, including a slide projector or a computer monitor, and could be connected to a variety of other types of video input signals such as video signals from a DVD drive, a VCR, or a television, In a preferred embodiment thereof, the projector comprises a housing supportable on a horizontal surface with a bottom side of the housing facing the horizontal surface. Preferably, the housing is of a vertically elongated tower configuration. The housing carries an image creation system operative to create a viewable image. According to one aspect of the invention, the housing carries specially designed elevation adjustment apparatus operative to engage the horizontal support surface and adjustably elevate a portion of the housing relative thereto.

From a broad perspective, the elevation adjustment apparatus includes an elevating structure vertically movable relative to the bottom housing side between downwardly extended and upwardly retracted positions in which the elevating structure respectively lifts and lowers the portion of the housing relative to the horizontal surface. A biasing structure resiliently biases the elevating structure toward its downwardly extended position, and a latch structure is operative to releasably lock the elevating structure.

Preferably, a bottom end portion of the elevating structure is defined by an elongated support foot structure operative to stabilize the vertically elongated projector. The support foot structure is horizontally pivotable relative to the balance of the elevating structure between a retracted position in which the foot structure is disposed substantially within the horizontal footprint of the housing, and an extended position in which opposite ends of the support foot project outwardly from the bottom side of the housing, beyond opposite sides thereof, and stabilize the tower configured projector against side-to-side tipping.

Illustratively, the elevating structure is incorporated in a specially designed elevator assembly operatively secured to a bottom front corner portion of the housing. The elevator assembly includes a vertically elongated pair of arcuate elevating legs which are vertically retractable into the housing interior, along opposite vertical side walls thereof and are complementarily and slidably carried in vertically elongated arcuate guide members for movement through arcuate paths. Spring structures downwardly bias the leg members toward extended positions, and the leg members have vertically spaced series of teeth thereon.

A frame member is carried within the housing for movement relative thereto transversely to the leg members and supports toothed locking members. The frame member is resiliently biased toward a position in which the teeth on the locking members engage the teeth on the elevating legs to lock them in a selectively variable vertical position relative to the housing. An opening is formed in a vertical wall of the housing and provides access to a portion of the frame member in a manner permitting it to be pushed away from its biased position to unlock the elevating legs and permit them to be resiliently driven downwardly away from their retracted positions to easily increase the operating elevation of the computer.

In a preferred embodiment of the elevator assembly, the bottom ends of the elevating legs are anchored to diametrically opposite peripheral portions of a disc member to which the support foot structure is pivotally secured. Cooperating detent structures on the foot structure and the disc member permit the foot structure to be releasably locked in either of its retracted and extended positions.

DETAILED DESCRIPTION

Figure 1:
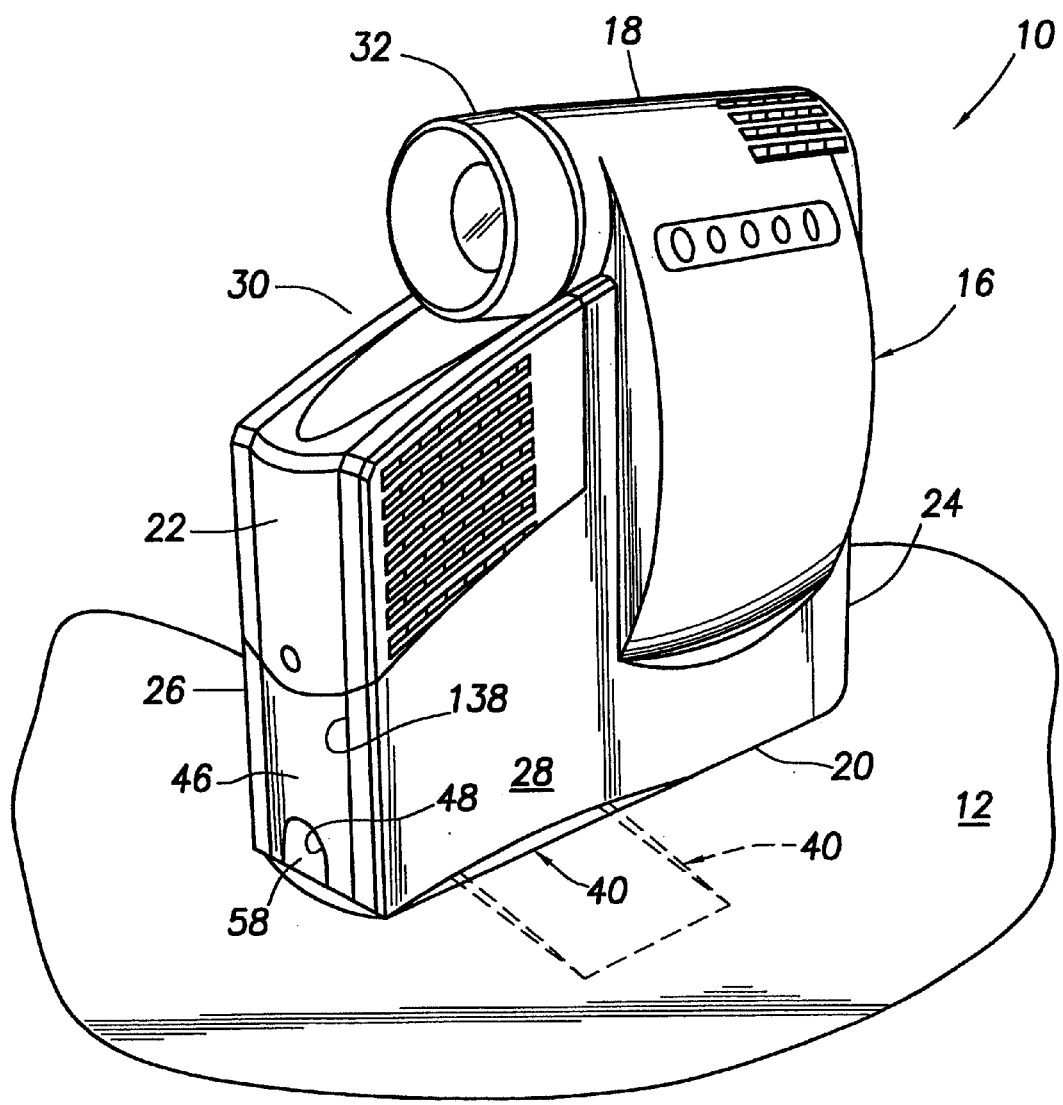
FIG. 1 is a front perspective view of a portable projector embodying principles of the present invention.
Figure 2:
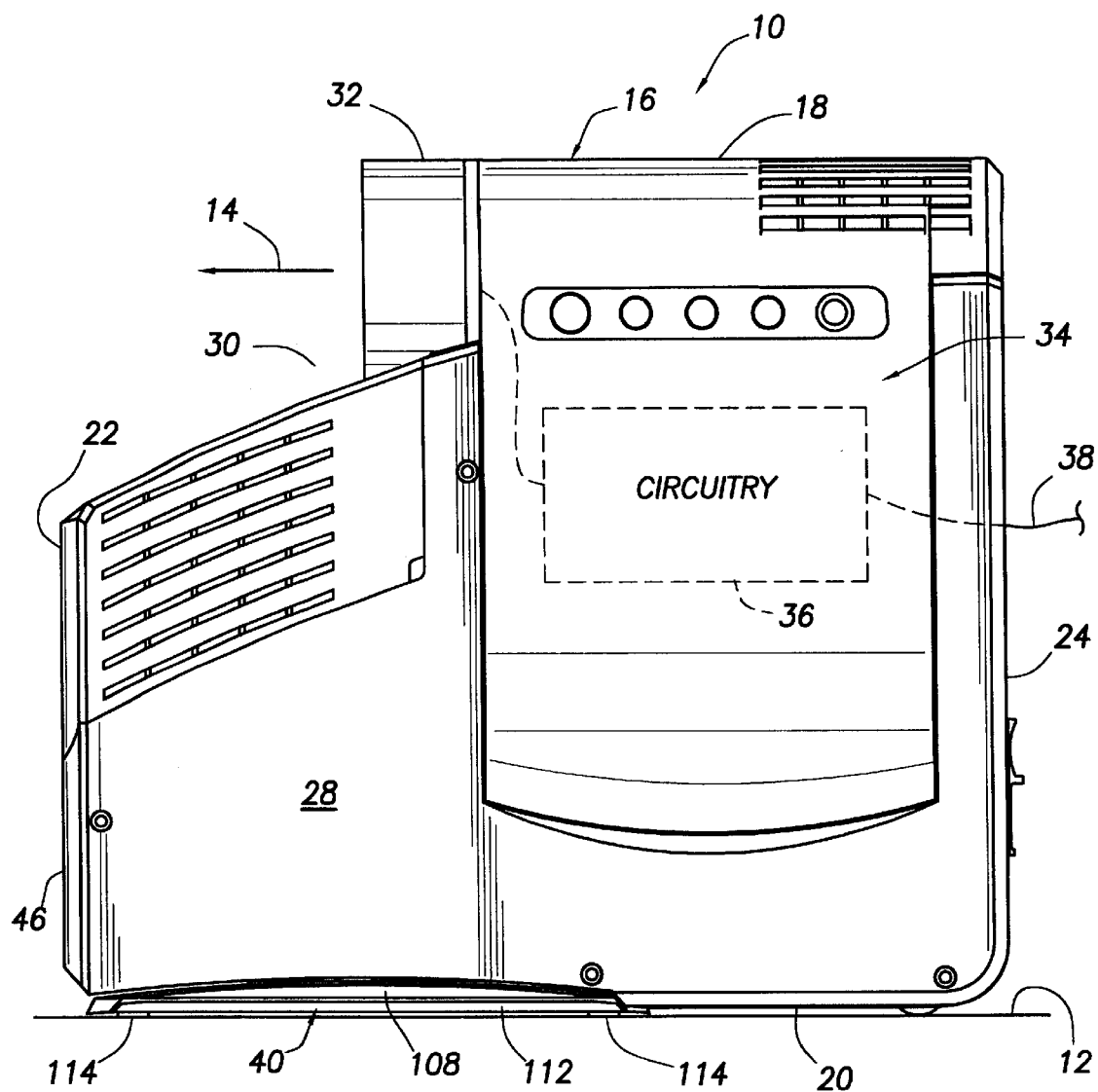
FIG. 2 is an enlarged scale right side elevational view of the projector in its lowered FIG. 1 orientation.
Figure 3:
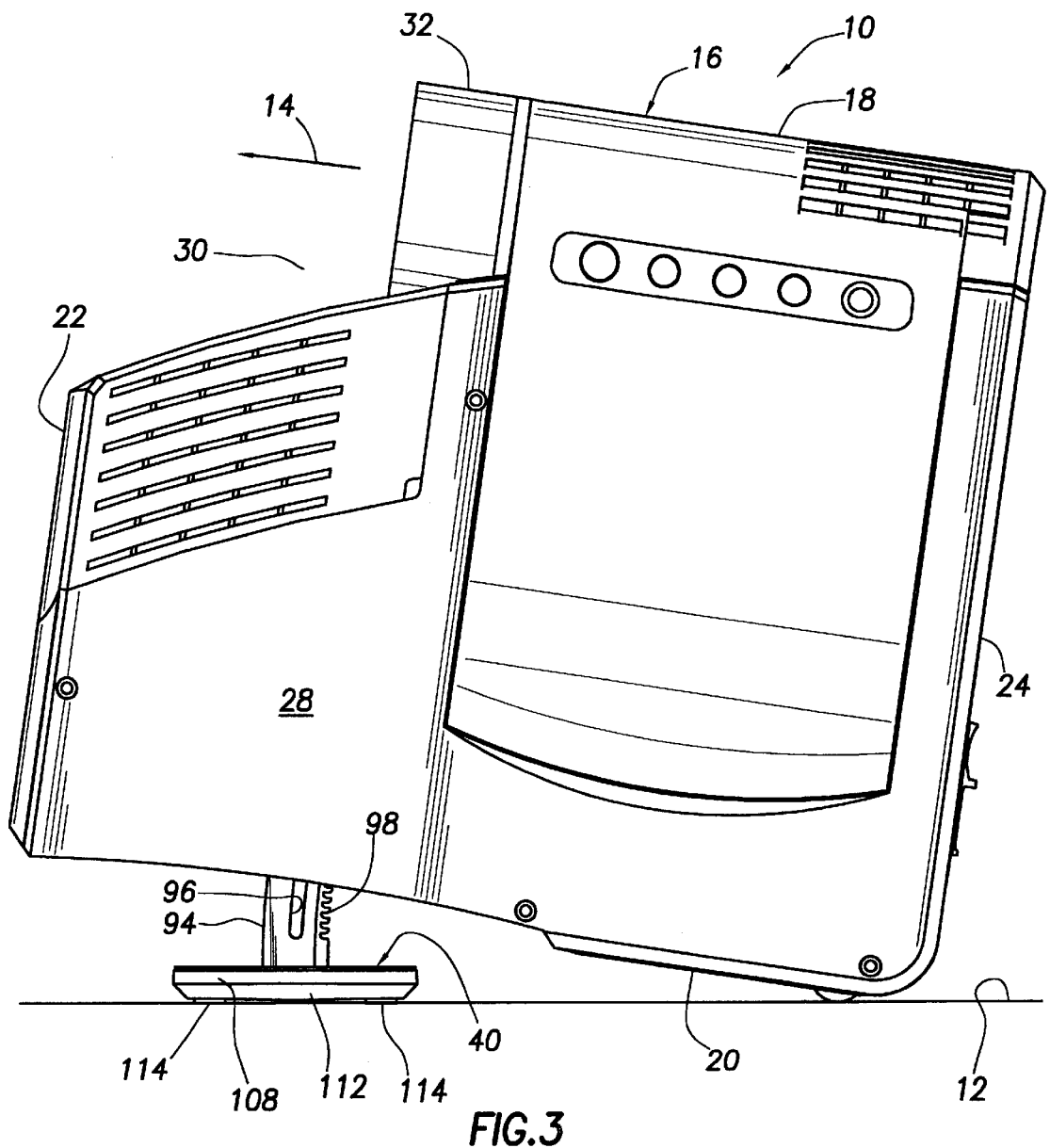
FIG. 3 is a view similar to that in FIG. 2, but with the projector in a pivotally elevated orientation.

Referring initially to FIGS. 1–3, the present invention provides image display apparatus which is representatively in the form of a portable image projector 10 which, in use, may be placed on a horizontal support surface 12, such as the top of a table, and operated to project an image 14 onto a remote display surface (not shown) such as a screen or wall.

Projector 10 includes a rectangular housing 16 which has a vertically elongated "tower" configuration, meaning that its height is appreciably greater at least one of its horizontal width and depth dimensions. Housing 16 has top and bottom walls 18 an 20, front and rear vertical side walls 22 and 24, and left and right vertical side walls 26 and 28. As can best be seen in FIG. 1, the overall height of the tower-configured projector 10 is substantially greater than its left-to-right horizontal width dimension. A front top side corner recess 30 is formed in the housing 16, with a lens 32 (through which the image 14 is forwardly projected) being operatively positioned at the rear of the recess 30.

As schematically depicted in FIG. 2, the projector 10 also includes a conventional image creation system 34 which includes the lens 32 and electrical circuitry 36 disposed within the interior of the housing 16. A suitable video input signal is transmitted to the circuitry 36 via a lead 38, with the circuitry 36 functioning in a known manner to translate the video source signal and form therefrom the image 14 which is forwardly projected outwardly through the lens 32.

Illustratively, the source of the video input signal is a computer, typically a notebook computer; with the input lead 38 being connected to the VGA port of the computer. However, the video input signal source could be received from a variety of other devices such as, for example, a DVD drive, a VCR or the output from a television set.

When the tower-configured projector 10 is rested atop the support surface 12 it is stabilized against tipping in either a rightward or leftward direction by an elongated rectangular support foot structure 40 which, in a manner subsequently described herein, is supported on a front underside portion of the housing 16 for horizontal pivotal movement relative to the housing between (1) a retracted storage and transport orientation (shown in solid line form in FIGS. 1 and 2) in which the support foot structure longitudinally extends forwardly and rearwardly and is disposed entirely within the vertical footprint of the housing 16, and (2) an extended stabilizing orientation (shown in FIG. 3 and in phantom in FIG. 1) in which the length of the support foot structure extends in a left-to-right direction, with opposite end portions of the support foot structure 40 extending outwardly beyond the left and right side walls 26,28 of the projector housing 16 to stabilize it against tipping to the left or to the right.

Figure 4:
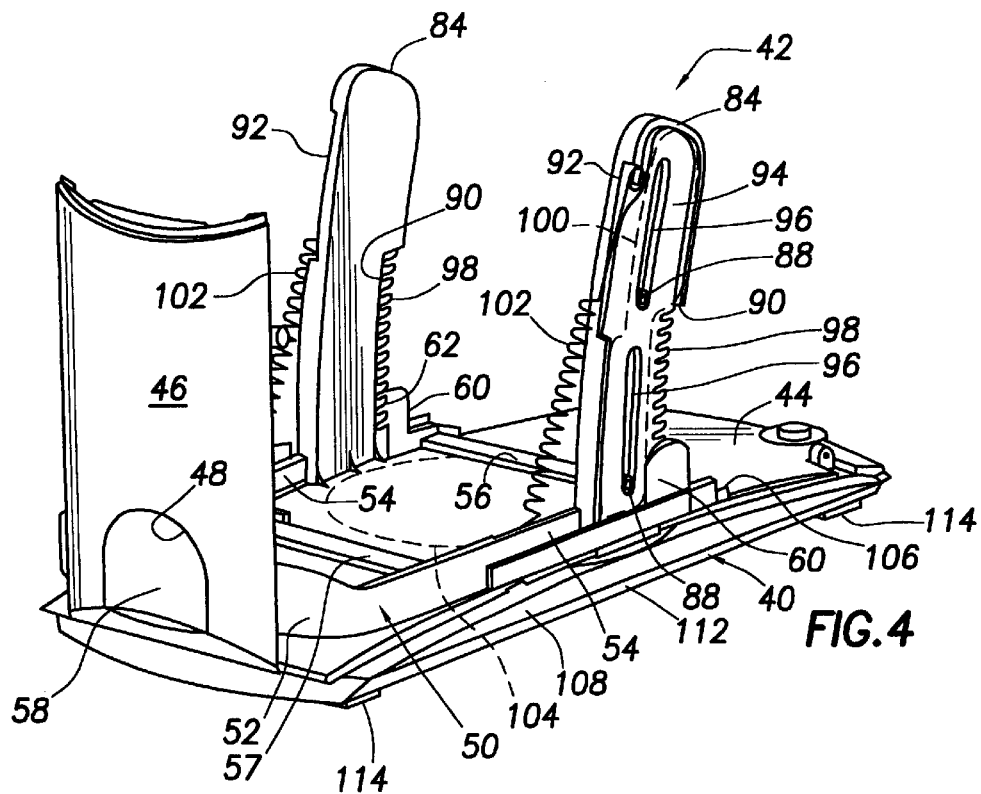
FIG. 4 is an enlarged scale perspective view of a specially designed elevator assembly removed from the projector, with elevating leg and support foot portions of the assembly being in retracted orientations.

The horizontally pivotable support foot structure 40 is part of a specially designed elevator assembly 42 (see FIGS. 4–6) that embodies principles of the present invention and is used, in a manner later described herein, to pivotally adjust the elevation of a front portion of the projector housing 16 between (1) a lowered orientation (see FIG. 2) in which the bottom wall 20 of the housing is parallel to the support surface 12, and (2) a pivotally elevated orientation (see FIG. 3) in which the bottom housing 20 is upwardly and forwardly inclined to correspondingly raise the screen location of the projected image 14.

Turning now to FIGS. 4–7, the elevator assembly 42 is installed on a lower front corner portion of the housing 16 and includes a rectangular base wall 44 which is elongated in a front-to-rear direction, and a front wall section 46 transversely extending upwardly from the front end of the base wall 44. For purposes later described herein, an opening 48 is formed through a lower end portion of the vertical front wall section 46.

A generally U-shaped frame 50 is supported on the top side of the base wall 44 for forward and rearward movement relative thereto and has a front end portion 52 rearwardy adjacent the rear side of the front wall section 46, and spaced apart leg portions 54 extending rearwardly from the opposite left and right ends of the front end portion 52 adjacent the left and right edges of the base wall 44. For reinforcement purposes the rear ends of the leg portions 54 are tied together with a cross member 56. An additional cross member 57 transversely extends between the leg portions 54 forwardly of the cross member 56.

The front end portion 52 of the frame 50 has a forwardly projecting button portion 58 that is complementarily received in the opening 48 in the vertical front wall section 46. A pair of upstanding locking members 60 are carried on rear end portions of the frame legs 54, for forward and rearward movement with the frame 50 relative to the base wall 44, and have forwardly projecting teeth 62 formed thereon.

Frame 50 is resiliently biased in a forward direction, in a manner such that the front end portion 52 of the frame 50 abuts the rear side of the vertical front wall 46, by a cylindrical compression spring 64 (see FIG. 7) received in a tubular portion 66 of a spring support bracket 68 anchored to the base wall 44. The spring 64 projects forwardly out of the tubular portion 66 and engages the rear side of the vertical wall 46. Bracket 68 is anchored to the base wall 44 by a screw 70 extending vertically through the bracket 68 and threaded into an underlying boss portion (not visible) of the base wall 44.

Figure 7:
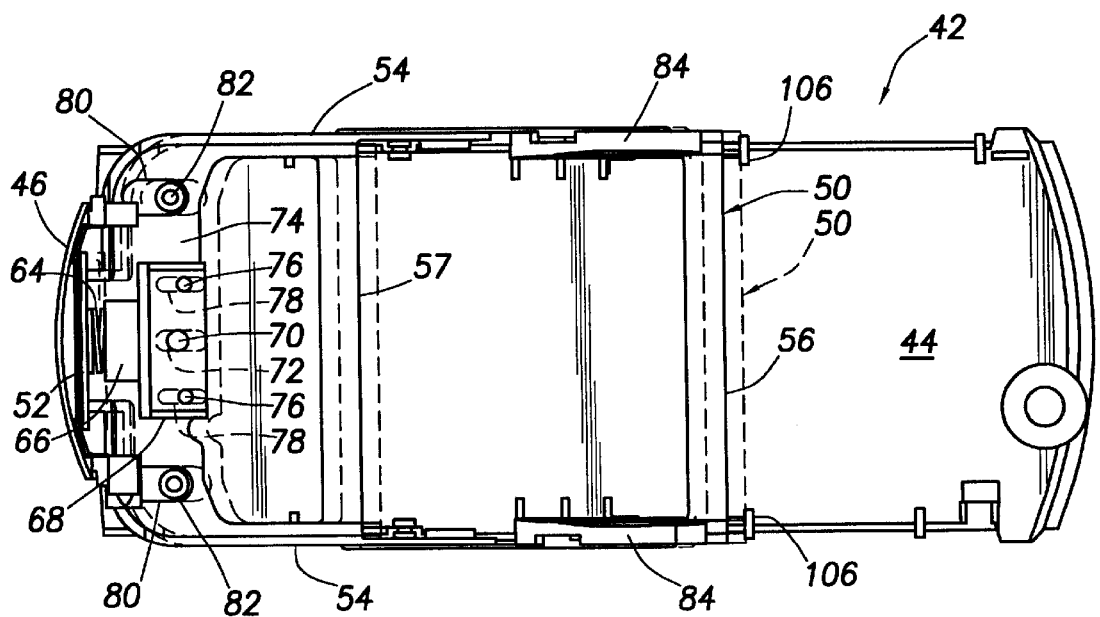
FIG. 7 is an enlarged scale top plan view of the elevator assembly in its FIG. 4 orientation.

To permit the forward and rearward movement of the frame 50 relative to the base wall 44 as later described herein, the screw 70 extends downwardly through an elongated guide slot 72 formed in a horizontal web portion 74 of the front frame end 52 that underlies the bracket 68. Guide pins 76 extend downwardly from the bracket 68 and are movably received in similarly elongated guide slots 78 formed in the web 74. Two additional elongated guide slots 80 are formed in the web 74 and movably receive a pair of upstanding cylindrical guide projections 82 formed on the base wall 44. As illustrated in FIG. 7, each of the guide slots 72,78,80 is elongated in a front-to-rear direction.

Still referring to FIGS. 4–7, the elevator assembly 42 also includes a pair of upwardly projecting, vertically elongated guide members 84 which are anchored at their lower ends to the base wall 44, adjacent the opposite left and right side edges thereof, just forwardly of the locking members 60. The guide members 84 are upwardly and rearwardly curved, and have outer side recesses 86 (most clearly illustrated in FIG. 6) extending along their lengths. A vertically spaced pair of horizontally projecting guide pins 88 are anchored to each of the guide members 84 within its outer side recess 86. The outer side recesses 86 extend rearwardly through rear side edge notches 90 formed in the guide members 84, and extend forwardly through front side edge notches 92 formed in the guide members 84.

A pair of generally plate-shaped, vertically elongated arcuate elevating leg members 94 are complementarily and slidingly received in the guide member recesses 86, are positioned inwardly of the frame legs 54, and extend downwardly through notches (not visible) formed in the left and right side edges of the base wall 44. Each elevating leg member 94 has a vertically spaced pair of arcuate, vertically elongated slots 96 formed therein and slidingly receiving the guide pins 88 of its associated guide member 84. Formed along the rear side edges of the elevating leg members 94 are a vertically spaced series of locking teeth 98 which are exposed through the rear side edge notches 90 of the vertical guide members 84 and are intermeshingly engageable by the forwardly projecting teeth 62 on the locking members 60.

The elevating leg members 94 are captively and slidably retained in the outer side recesses 86 of their associated vertical guide members 84 by vertically elongated retaining plate members 100 outwardly overlying the elevating leg members 94 and being suitably secured to the guide pins 88. For purposes of illustrative clarity, only one of the retaining plate members 100 has been illustrated (in phantom in FIG. 4). Elevating leg members 94 are resiliently biased in a downward direction relative to their associated guide members 84 by a pair of elongated tension spring members 102 secured at upper ends thereof to upper ends of the elevating leg members 94, and at lower ends thereof to the base wall 44 forwardly of the vertical guide members 84.

Figure 5:
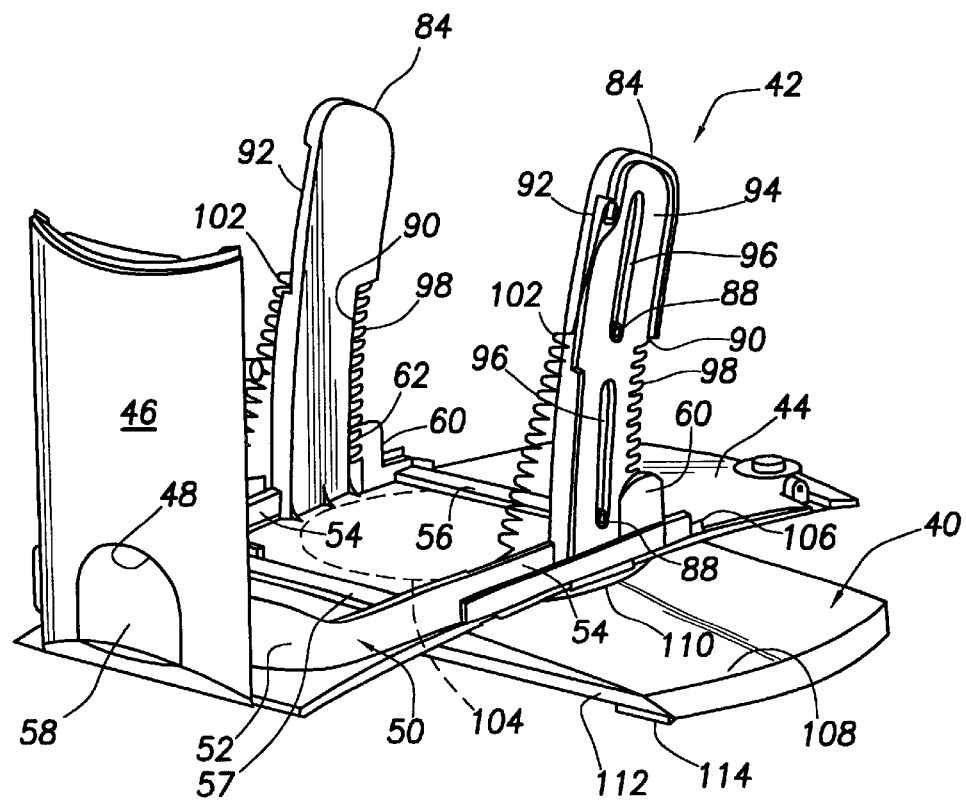
FIG. 5 is a view similar to that in FIG. 4, but with the support foot portion of the elevator assembly in its extended orientation.
Figure 6:
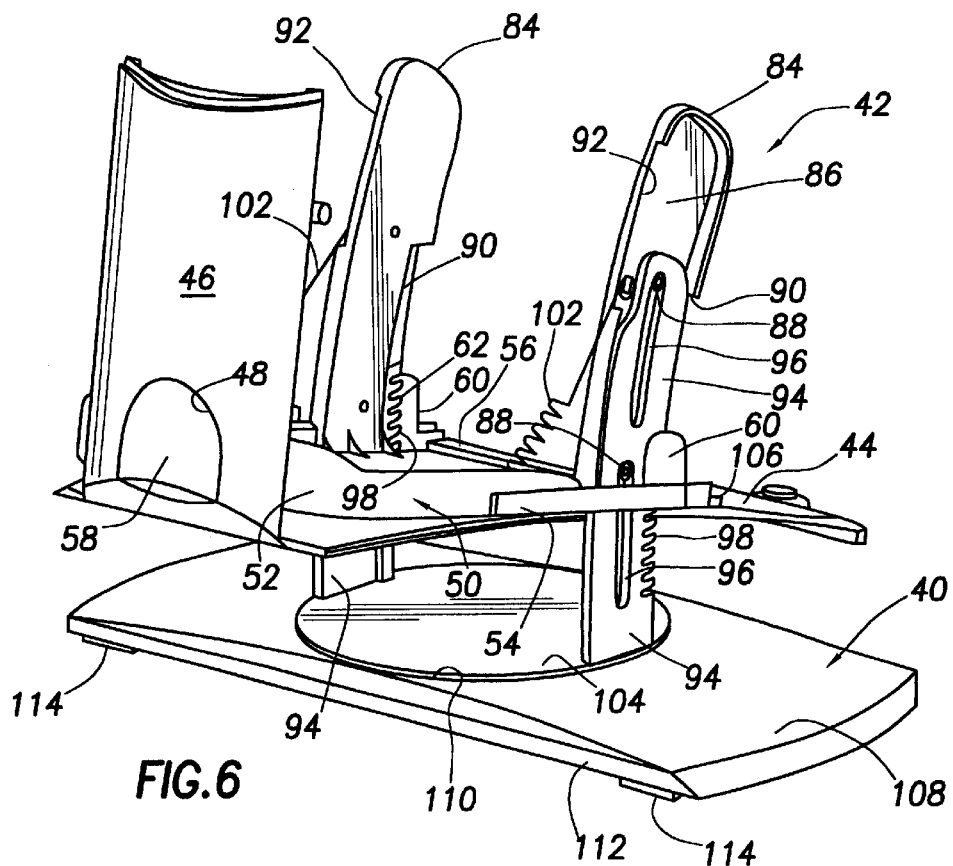
FIG. 6 is a view similar to that in FIG. 5, but with the elevating leg portions of the elevator assembly in extended orientations.

As best illustrated in FIG. 6, the lower ends of the elevating leg members 94 are fixedly secured to diametrically opposite peripheral portions of a disc member 104 which, in turn, is rotatably secured to the support foot structure 40 as later described herein. By comparing FIGS. 5 and 6 it can be seen that the elevating legs can be vertically moved relative to the balance of the elevator assembly 42 between (1) an upwardly retracted orientation (FIG. 5), and (2) a downwardly extended orientation (FIG. 6).

With the elevating legs 94 in their FIG. 5 upwardly retracted orientations, the disc 104 is closely adjacent the underside of the base wall 44, and the legs 94 are in upper limit positions within the outer side recesses 86 of their associated vertical guide members 84, with the guide pins 88 being in abutment with the lower ends of the leg slots 96. With the elevating legs 94 in their FIG. 6 downwardly extended orientations, the legs 94 are downwardly moved to lower limit positions within their associated guide member recesses 86, with the guide pins 88 abutting the upper ends of the leg slots 96, and the disc member 104 (and thus the support foot structure 40) is moved downwardly apart from the base wall 44.

With the elevating legs 94 in either of these positions, or somewhere therebetween, the intermeshing of the locking member and elevating leg teeth 62,98 locks the elevating legs 94 in their particular vertical positions relative to the base wall 44. However, the elevating legs 94 may be unlocked, to adjust their vertical position, simply by rearwardly pressing the button 58 (see FIGS. 4–6). This rearwardly shifts the frame 50 from its solid line position in FIG. 7 to its dotted line position, against the resilient resistance of the compression spring 64. The rearward shift of the frame 50 relative to the base wall 44 correspondingly moves the locking members 60 (see FIGS. 4–6) rearwardly to disengage their teeth 62 from the elevating leg teeth 98, thereby unlocking the elevating legs 94 and permitting vertical adjustment movement thereof (and thus the support foot structure 40) relative to the balance of the elevator assembly 42. Rearward movement of the frame 50 relative to the base wall 44 is limited by a pair of upstanding projections 106 (see FIG. 7) formed on the base wall 44 and acting as abutments for the rear ends of the frame legs 54 when the button 58 is rearwardly pushed in.

As previously mentioned, the tension springs 102 exert a downward resilient biasing force on the elevating legs 94. Thus, when the button 58 is inwardly pushed with the legs 94 in raised orientations the springs 102 tend to drive the legs 94 downwardly toward their FIG. 6 lower limit positions. When the button 58 is released, the compression spring 64 (see FIG. 7) forwardly drives the frame 50 from its dotted line release orientation to its solid line locking orientation. This, in turn, forwardly returns the rearwardy shifted locking members 60 (see FIGS. 4–6) to re-engage their teeth 62 with the elevating leg member teeth 98 and again releasably lock the elevating leg members against vertical movement relative to the balance of the elevator assembly 42.

Figure 8:
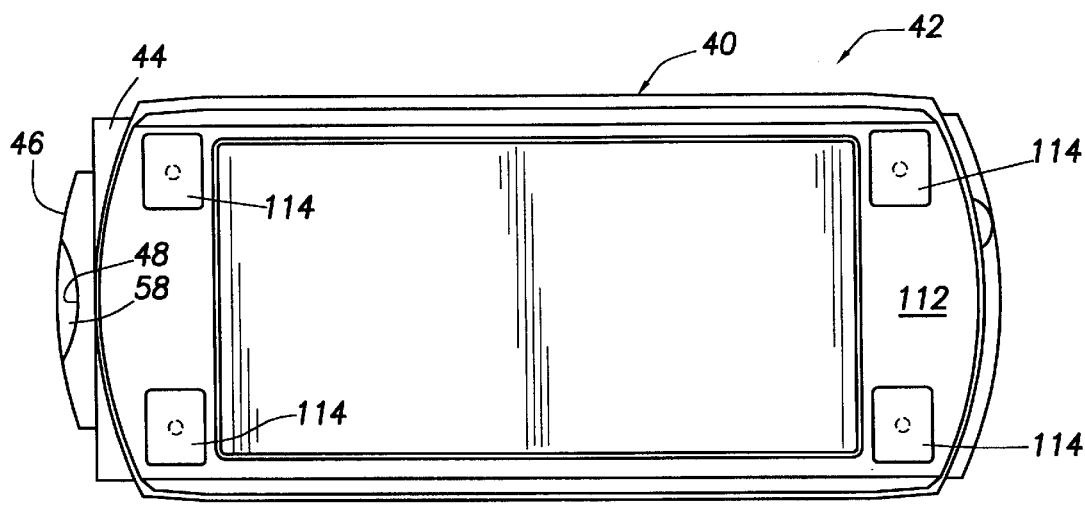
FIG. 8 is a bottom plan view of the elevator assembly with the horizontally pivotable support foot in its retracted orientation.
Figure 9:
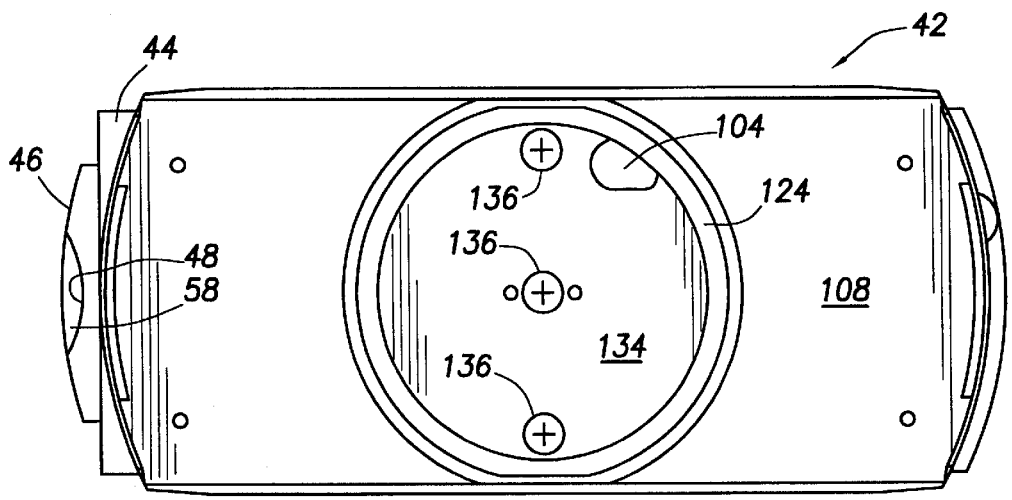
FIG. 9 is a view similar to that in FIG. 8, but with a bottom plate portion of the support foot having been removed.

Turning now to FIGS. 5, 6 and 8–10, the support foot structure 60 includes an elongated rectangular top plate member 108 (see FIGS. 5 and 10) having a top side recess 110 formed therein, and an elongated rectangular bottom plate member 112 (see FIGS. 5 and 8) having a top side recess (not visible in the drawings) and being secured to the bottom side of the top plate member 108. As best illustrated in FIG. 8, four resilient protective pads 114 are suitably secured to the corners of the underside of the bottom plate member 112.

Figure 10:
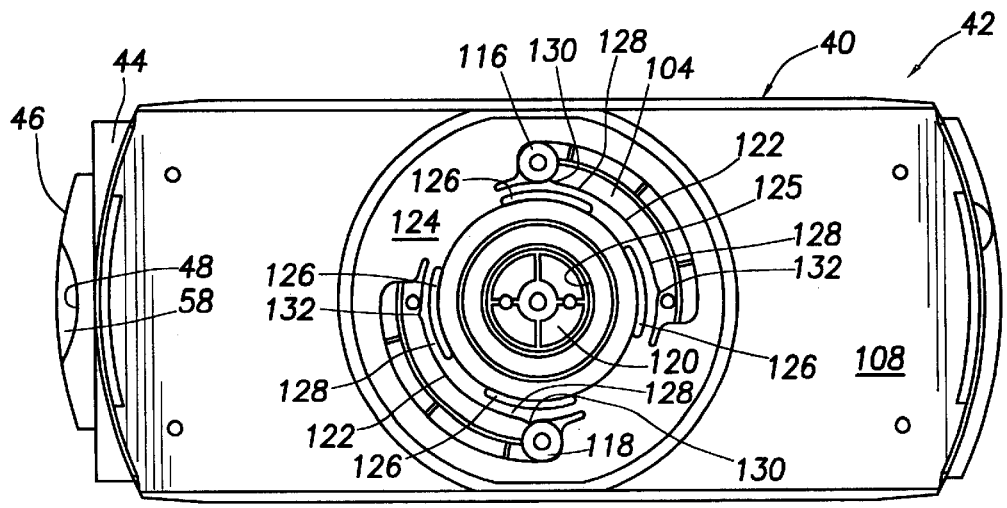
FIG. 10 is a view similar to that in FIG. 9, but with a central retaining disc having been removed from the support foot.

Disc 104 is rotatable received in the circular recess 110 formed in the top side of the top plate member 108 and has three downwardly projecting cylindrical bosses 116,118 and 120 (see FIG. 10). Bosses 116 and 118 are positioned adjacent the opposite side edges of the top plate member 108, and the boss 120 is centrally disposed between the bosses 116,118 and has a substantially larger diameter than either of them. As best illustrated in FIG. 10, diametrically opposite arcuate slots 122 are formed through the bottom side wall 124 of the top side recess 110 in the top plate member 108, with each slot 122 extending through an arc of ninety degrees.

Centrally disposed between the slots 122 is a circular opening 125 formed through the bottom side wall 124 and rotatably receiving the central disc boss 120. The outer disc bosses 116,118 are slidably received within the slots 122. Arcuate slots 126 formed through the bottom side wall 124 radially between the slots 122 and the central boss 120 define along the radially inner side of each of the slots 122 two radially flexible arcuate wall segments 128. Each of the wall segments 128 has a circumferentially spaced pair of detent projections 130,132 that radially project into its associated slot 122.

The disc 104 is captively retained on the top plate member 108, in a manner permitting the top plate member 108 to be horizontally rotated relative thereto about the axis of the central boss 120, by a circular retaining plate 134 (see FIG. 9) that is positioned against the underside of the bottom side wall 124 and secured to the disc member 104 by three screws 136 extended through suitable openings in the retaining plate 134 and threaded into the bosses 116,118,120. After the installation of the retaining plate 134 on the underside of the bottom wall 124 of the top plate member recess 110 (see FIG. 9), the bottom plate member 112 is suitably secured to the bottom of the top plate member 108, thereby covering the retaining plate 134 as shown in FIG. 8.

The assembled support foot structure 40 is thus horizontally pivotable relative to the disc member 104 about the axis of the central boss 120 through an arc of ninety degrees, with such pivoting of the support foot structure 40 causing the outer bosses 116,118 to circumferentially move through the slots 122 (see FIG. 10) between their opposite ends. As each of the bosses 116,118 approaches an end of its associated slot 122 it cammingly engages one of the detent projections 130,132 in a manner thereby radially inwardly deflecting the wall segment 128 on which the detent projection is disposed. When the bosses 116,118 reach the other sides of these detent projections the deflected wall segments 128 snap back to their original orientations and cause the detent projections 130,132 immediately adjacent the bosses 116,118 to act as detent abutments which releasably hold the support foot structure 40 in its rotationally adjusted orientation.

As can be seen in FIG. 10, the top plate member 108 is releasably locked relative to the disc member 104 by the interengagement between the bosses 116,118 with the immediately adjacent detent projections 130. However, the top plate member 108 (and thus the assembled support foot structure 40) can be rotated ninety degrees in a counter-clockwise direction relative to the disc member 104 and releasably locked in this new position by means of the interengagement of the bosses 116,118 and the detent projections 132.

Returning briefly to FIG. 1, the elevator assembly 42 is suitably secured to the projector housing 16 in a manner such that the vertical front wall 46 of the elevator assembly 42 is complementarily received in an opening 138 in a lower end portion of the front housing wall 22 (see FIG. 1), and the elevator assembly base wall 44 (see FIG. 4) extends along a front underside portion of the housing 16. The portion of the elevator assembly 42 disposed within the interior of the housing 16 (i.e., the frame 50 and the vertical guide members 84 and associated elevating leg members 94) occupy only a minimal volume within the housing 16. Specifically, the vertical guide members 84 extend upwardly along the inner sides of the left and right housing walls 26 and 28, the frame legs 54 extend horizontally along the inner sides of the left and right housing walls 26 and 28, and the front frame end 52 is inwardly adjacent the front side of the housing 16.

To prepare the projector 10 for use, it is placed on the horizontal support surface 12 and the support foot structure 40 is pivoted outwardly from its solid line retracted position shown in FIG. 1 to its dotted line stabilizing position. This pivoting of the support foot structure 40 to its stabilizing position may be done before the projector 10 is placed on the support surface 12, or after it is placed on the support surface 12 by lifting the front of the projector and then outwardly pivoting the support foot structure 40.

The pivotal elevation of the projector 10 may then be suitably adjusted by simply lifting the front of the projector and pushing the frame button 58 inwardly. This rearwardly moves the locking members 60 (see FIG. 5) away from their associated elevating leg members 94 to permit the springs 102 to drive the leg members 94 downwardly toward their extended positions until the support foot structure 40 contacts the support surface 12 (see FIG. 3. The button 58 is then released to permit the spring 64 (see FIG. 7) to forwardly drive the locking members 60 back into toothed locking engagement with the now downwardly shifted elevating legs 94 and thereby releasably lock the projector 10 in a pivotally elevated orientation and raise the level of the projected image 14 on the remote display screen. Further pivotal adjustments may be similarly made by simply pushing the button 58, raising or lowering the front end of the projector 10, and then releasing the button 58.

Compared to conventionally configured projectors, the specially designed projector 10 of the present invention provides a variety of advantages. For example, compared to conventional vertically foreshortened projectors, the vertically elongated tower configuration of the projector 10 gives it a substantially smaller vertical footprint so that it desirably occupies less area on the horizontal support surface 12. Also due to the tower configuration of the projector 10 its lens 32 is positioned at a greater vertical distance from the support surface 12 so that less pivotal adjustment of the lens 32 is required to raise the projected image 14 relative to the display screen. With less pivotal lens adjustment required, the axis of the lens 32 can remain more perpendicular to the display screen, thereby desirably reducing "keystoning" distortion of the projected image 14 on the display screen. The higher positioning of the lens 32 also makes it easier to project over obstacles on the support surface 12.

As previously mentioned, the increased side-to-side tipping instability inherent in the projector's vertically elongated tower configuration is very efficiently and effectively compensated for by the horizontally pivotable support foot structure. The arcuate shapes and travel paths of the elevating legs 94 assure that the bottom of the support foot structure 40 remains parallel to the support surface 12 regardless of the vertically adjusted position of the elevating legs 94 relative to the projector housing 16. Further, the spring-loaded, button-controlled elevation control of the legs 94 makes the pivotal elevation adjustment of the projector considerably easier than that of a conventional projector.

While the elevator assembly 42 has been illustrated and described as being incorporated in a projector having a tower configuration, it will readily be appreciated by those of skill in this particular art that it could be alternatively be utilized to advantage in a projector having a non-tower configuration. Moreover, while principles of the present invention have been representatively illustrated and described in conjunction with a projector, it will be readily appreciated that they could also be utilized to advantage in a variety of other types of image display devices including slide projectors, televisions, monitors and the like if desired.

The foregoing detailed description is to be clearly understood as being given by way of illustration and example only, the spirit and scope of the-present invention being limited solely by the appended claims.

What is claimed is:

1. A display apparatus supportable on a surface, comprising:
    a housing structure;
    an image creation system at least partially disposed within the housing structure;
    an elevation adjustment apparatus adapted to secure the housing structure at a plurality of raised orientations relative to the surface, the elevation adjustment apparatus comprising:
        an elevating structure including a plurality of spaced grooves;
        a latching structure including at least one engagement portion adapted to intermeshingly engage with the spaced grooves; and
        an elastic member, wherein the elastic member biases the elevating structure and the latching structure into locked engagement.

2. The display apparatus as recited in claim 1, wherein the display apparatus comprises a projector.

3. The display apparatus as recited in claim 2, wherein the projector comprises a portable projector.

4. The display apparatus as recited in claim 1, wherein the elevation adjustment apparatus comprises a bottom end portion pivotable relative to the housing structure.

5. The display apparatus as recited in claim 1, wherein the plurality of raised orientations comprise an arcuate path of travel.

6. The display apparatus as recited in claim 1, wherein the latching structure further comprises a frame, wherein the engagement portion is positionably coupled to the frame and wherein the elastic member biases the frame.

7. The display apparatus as recited in claim 1, wherein the elevating structure comprises first and second elevating leg members disposed adjacent and parallel to opposite walls of the housing structure, the leg members being vertically relative to the housing structure.

8. The display apparatus as recited in claim 7, wherein the first and second elevating leg members comprise arcuate configurations.

9. The display apparatus as recited in claim 1, further comprising a release mechanism, wherein the release mechanism is adapted to selectively disengage the elevating structure from the latching structure.

10. The display apparatus as recited in claim 9, wherein the release mechanism is hand-operable.

11. The display apparatus as recited in claim 10, wherein the release mechanism is accessible via an aperture located in a front wall of the housing structure.

12. The display apparatus as recited in claim 1, further comprising an external source, wherein the external source provides an input signal.

13. The display apparatus as recited in claim 12, wherein the input signal comprises a video signal.

14. The display apparatus as recited in claim 12, wherein the external source comprises a computer.

15. A method for orienting a display apparatus including a housing at a plurality of raised orientations, comprising:
    disposing an image creation system at least partially within the housing;
    coupling a first engagement structure to the housing;
    biasing a first engagement portion disposed on the first engagement structure into intermeshing engagement with a second engagement portion disposed on a second engagement structure via an elastic member, wherein intermeshing engagement comprises locking the raised orientation at a selected raised orientation; and
    selectively actuating a release mechanism, wherein the release mechanism disengages the first engagement portion from the second engagement portion.

16. The method as recited in claim 15, further comprising rotating a support foot with respect to the housing.

17. The method as recited in claim 15, wherein biasing comprises biasing via a compression spring.

18. The method as recited in claim 17, further comprising at least partially disposing the compression spring within a tubular portion coupled to a base wall of the housing.

19. The method as recited in claim 15, wherein intermeshing engagement comprises engaging tooth and groove structures disposed on the first and second engagement portions respectively with one another.

20. The method as recited in claim 15, wherein biasing comprises disposing the first engagement portion on a frame.

21. The method as recited in claim 20, further comprising coupling the release mechanism to the frame.

22. The method as recited in claim 21, wherein selectively actuating comprises accessing the release mechanism via an aperture located within a front wall of the housing.

23. The method as recited in claim 21, wherein selectively actuating comprises manually actuating the release mechanism.

24. The method as recited in claim 15, further comprising coupling at least one arcuate leg member to the second engagement structure.

25. The method as recited in claim 14, further comprising directing the housing via an arcuate guide member.

26. The method as recited in claim 25, comprising coupling the arcuate guide member to the housing.

27. The method as recited in claim 25, further comprising biasing the guide member towards the at least one arcuate leg member via a tension spring.

28. The method as recited in claim 24, further comprising rotating a support structure coupled to the at least one arcuate leg member with respect to the housing.

29. The method as recited in claim 15, further comprising connecting the image creation system to an external source wherein the external source provides an input signal.

30. A display apparatus supportable on a surface, comprising:
    a housing including a base wall, the housing positionable at a plurality of raised orientations with respect to the surface;
    a frame disposed adjacent to the base wall, the frame comprising a first engagement portion;
    a second engagement portion;
    an elastic member coupled to the base wall, wherein the elastic member biases the first and second engagement portions into intermeshing engagement, the raised orientation being restricted to a selected orientation; and
    a release member coupled to the frame, the release member being adapted to selectively disengage the first and second engagement portions.

31. The display apparatus as recited in claim 30, further comprising an external source, wherein the external source provides an input signal.

32. The display apparatus as recited in claim 31, wherein the input signal comprises a video signal.

33. The display apparatus as recited in claim 31, wherein the external source comprises a computer.

34. The display apparatus as recited in claim 30, further comprising a support structure, wherein the support structure is rotatable with respect to the housing.

35. The display apparatus as recited in claim 30, wherein the plurality of vertical orientations comprise an arcuate path of travel.

36. The display apparatus as recited in claim 30, wherein the housing comprises a front wall including an aperture, wherein the release mechanism is accessible via the aperture.

37. The display apparatus as recited in claim 30, wherein the release mechanism is hand-operable.

38. The display apparatus as recited in claim 30, wherein the first and second engagement portions respectively comprise corresponding tooth and groove members adapted to mate with one another.

39. The display apparatus as recited in claim 30, wherein the elastic member comprises a compression spring.

40. The display apparatus as recited in claim 39, further comprising a tubular portion coupled to the base wall, at least a portion of the compression spring being disposed therein.

41. The display apparatus as recited in claim 30, further comprising an arcuate leg member, the second engagement portion being disposed on the arcuate leg member.

42. The display apparatus as recited in claim 41, further comprising a guide member coupled to the housing, the guide member configured to direct the housing along the arcuate leg member.

43. The display apparatus as recited in clam 41, further comprising a tension spring configured to bias the guide member toward the arcuate leg member.

\* \* \* \* \*